(12) United States Patent
Abe et al.

(10) Patent No.: US 12,449,542 B2
(45) Date of Patent: Oct. 21, 2025

(54) MEASUREMENT APPARATUS, INFORMATION PROCESSING APPARATUS, DATA SPECIFYING METHOD, AND NON-TRANSITORY COMPUTER-READABLE MEDIUM

(71) Applicant: NEC Corporation, Tokyo (JP)

(72) Inventors: Jiro Abe, Tokyo (JP); Akira Tsuji, Tokyo (JP); Junichi Abe, Tokyo (JP); Yoshimasa Ono, Tokyo (JP)

(73) Assignee: NEC CORPORATION, Tokyo (JP)

( * ) Notice: Subject to any disclaimer, the term of this patent is extended or adjusted under 35 U.S.C. 154(b) by 814 days.

(21) Appl. No.: 17/778,496

(22) PCT Filed: Nov. 29, 2019

(86) PCT No.: PCT/JP2019/046835
§ 371 (c)(1),
(2) Date: May 20, 2022

(87) PCT Pub. No.: WO2021/106207
PCT Pub. Date: Jun. 3, 2021

(65) Prior Publication Data
US 2023/0036969 A1    Feb. 2, 2023

(51) Int. Cl.
*G01S 17/894*    (2020.01)
*G01S 7/497*    (2006.01)
*G01S 17/89*    (2020.01)

(52) U.S. Cl.
CPC ............. *G01S 17/89* (2013.01); *G01S 7/497* (2013.01)

(58) Field of Classification Search
CPC ........ G01S 17/89; G01S 17/894; G01S 7/497; G01S 17/87; G06F 3/0425; G06T 7/70
See application file for complete search history.

(56) References Cited

U.S. PATENT DOCUMENTS

2010/0235129 A1    9/2010   Sharma et al.
2017/0243052 A1*   8/2017   Sugama ................ G06F 3/0425

FOREIGN PATENT DOCUMENTS

JP    2011-226880 A    11/2011
JP    2019-101000 A     6/2019
WO    2019/186742 A1   10/2019

OTHER PUBLICATIONS

International Search Report for PCT Application No. PCT/JP2019/046835, mailed on Feb. 18, 2020.
(Continued)

*Primary Examiner* — Abdullahi Nur
(74) *Attorney, Agent, or Firm* — Sughrue Mion, PLLC (57) ABSTRACT

A measurement apparatus according to the present disclosure includes a position specifying unit configured to specify, using an apparatus reference coordinate system having a position of the measurement apparatus set as a reference, a position of each of a plurality of other measurement apparatuses; a candidate specifying unit configured to extract at least three measurement apparatuses out of the measurement apparatus and the plurality of the other measurement apparatuses and to specify, based on the positions of the extracted measurement apparatuses, a candidate region that serves as a candidate of a common region referred to in performing alignment of data captured by the measurement apparatus and the plurality of the other measurement apparatuses; and a common region determining unit configured to determine the common region based on the distribution of the plurality of the candidate regions obtained by changing combinations of the measurement apparatuses to be extracted.

13 Claims, 8 Drawing Sheets

(56) References Cited

OTHER PUBLICATIONS

Andreas Ullrich, "Near real-time automatic registration of terrestrial scan data", EuroCOW, Jun. 8, 2017, Hannover, Germany.
Yoshisada, Hikaru et al, Proposal for an Indoor Map Generation Method Using Two-Dimensional Point Group Integration with Different Base Points, IPSJ SIG Technical Report, vol. 117, No. 451, pp. 39-50, Feb. 19, 2018.

\* cited by examiner

MEASUREMENT APPARATUS, INFORMATION PROCESSING APPARATUS, DATA SPECIFYING METHOD, AND NON-TRANSITORY COMPUTER-READABLE MEDIUM

This application is a National Stage Entry of PCT/JP2019/046835 filed on Nov. 29, 2019, the contents of all of which are incorporated herein by reference, in their entirety.

TECHNICAL FIELD

The present disclosure relates to a measurement apparatus, an information processing apparatus, a data specifying method, and a program.

BACKGROUND ART

In recent years, construction of a facility monitoring system using LiDAR (Light Detection And Ranging) has been studied. LiDAR is a technique for measuring a distance from a monitoring apparatus to an object to be monitored and enabling scanning of the shape of the object. LiDAR uses, for example, a ToF (Time of Flight) method. Using the ToF method, LiDAR emits light from a monitoring apparatus to an object to be monitored. The monitoring apparatus then receives a reflected light of the emitted light. The LiDAR-equipped monitoring apparatus measures the distance to the object to be monitored based on the time it has taken from emission of light to reception of the reflected light and the speed of the light.

However, when the distance to the object to be monitored is measured using LiDAR, the light emitted by LiDAR is blocked by buildings and the like and thus does not reach the regions behind the buildings. That is, data measured at only one point does not include data of the distance to an object that is in a blind spot region. Therefore, it is necessary to supplement data of the blind spot region by combining data measured at a plurality of points.

Non-Patent Literature 1 discloses a method of integrating a plurality of point cloud data by projecting point cloud data acquired at a plurality of points on the ground and performing correction to align the orientation of the characteristic structures in the projected images.

CITATION LIST

Non Patent Literature

Non Patent Literature 1: Andreas Ullrich, "Near real-time automatic registration of terrestrial scan data" EuroCOW, Jun. 8, 2017

SUMMARY OF INVENTION

Technical Problem

However, when the method disclosed in Non-Patent Literature 1 is used, there is a case where correction is performed on an image represented by point cloud data to align the orientation of the objects having structures that are similar to one another but not the same. For instance, in the method disclosed in Non-Patent Literature 1, images are corrected to align the orientation of two different objects having rectilinear features. As a result, there arises a problem that data generated by integrating the point cloud data acquired at a plurality of points does not correctly represent the object to be monitored.

An object of the present disclosure is to provide a measurement apparatus, an information processing apparatus, a data specifying method, and a program each adapted to correctly integrate three-dimensional data acquired at a plurality of points.

Solution to Problem

A first aspect of the present disclosure is a measurement apparatus including:

a position specifying unit configured to specify, using an apparatus reference coordinate system having a position of the measurement apparatus set as a reference, a position of each of a plurality of other measurement apparatuses;

a candidate specifying unit configured to extract at least three measurement apparatuses out of the measurement apparatus and the plurality of the other measurement apparatuses and to specify, based on the positions of the extracted measurement apparatuses, a candidate region that serves as a candidate of a common region referred to in performing alignment of data captured by the measurement apparatus and the plurality of the other measurement apparatuses; and a common region determining unit configured to determine the common region based on the distribution of the plurality of the candidate regions obtained by changing combinations of the measurement apparatuses to be extracted.

A second aspect of the present disclosure is an information processing apparatus for collecting information from a plurality of measurement apparatuses, including:

a communication unit configured to receive first distance data indicating a distance from each of the plurality of the measurement apparatuses to an object in the surroundings thereof specified by the respective measurement apparatuses;

a position specifying unit configured to specify a position of each of the plurality of the measurement apparatuses using the first distance data and third distance data indicating a distance among the apparatuses included in the plurality of the measurement apparatuses;

a candidate specifying unit configured to extract at least three measurement apparatuses out of the plurality of the measurement apparatuses and to specify, based on the positions of the extracted measurement apparatuses, a candidate region that serves as a candidate of a common region referred to in performing alignment of data captured by the plurality of the measurement apparatuses; and a common region determining unit configured to determine the common region based on distribution of a plurality of the candidate regions obtained by changing combinations of the measurement apparatuses to be extracted.

A third aspect of the present disclosure is a data determining method including:

specifying, using an apparatus reference coordinate system having a position of the measurement apparatus set as a reference, a position of each of a plurality of other measurement apparatuses;

extracting at least three measurement apparatuses out of the measurement apparatus and the plurality of the other measurement apparatuses;

specifying, based on the positions of the extracted measurement apparatuses, a candidate region that serves as a candidate of a common region referred to in performing alignment of data captured by the measurement apparatus and the plurality of the other measurement apparatuses; and determining the common region based on the distribution of the plurality of the candidate regions obtained by changing combinations of the measurement apparatuses to be extracted.

A fourth aspect of the present disclosure is a program for causing a computer apparatus to execute the processes of:

specifying, using an apparatus reference coordinate system having a position of the measurement apparatus set as a reference, a position of each of a plurality of other measurement apparatuses;

extracting at least three measurement apparatuses out of the measurement apparatus and the plurality of the other measurement apparatuses;

specifying, based on the positions of the extracted measurement apparatuses, a candidate region that serves as a candidate of a common region referred to in performing alignment of data captured by the measurement apparatus and the plurality of the other measurement apparatuses; and determining the common region based on the distribution of the plurality of the candidate regions obtained by changing combinations of the measurement apparatuses to be extracted.

Advantageous Effects of Invention

According to the present disclosure, it is possible to provide a measurement apparatus, an information processing apparatus, a data specifying method, and a program each adapted to correctly integrate three-dimensional data acquired at a plurality of points.

DESCRIPTION OF EMBODIMENTS

First Example Embodiment

Hereinbelow, example embodiments of the present disclosure will be described with reference to the drawings. A configuration example of a measurement apparatus 10 according to a first example embodiment will be described with reference to FIG. 1. The measurement apparatus 10 may be a computer apparatus that operates by causing a processor to execute a program stored in a memory. The measurement apparatus 10 may be, for example, a LiDAR apparatus. The LiDAR apparatus is an apparatus that measures a distance to an object in the surroundings thereof and performs scanning for the shape of the object. The measurement apparatus may be rephrased as a monitoring apparatus. Alternatively, the measurement apparatus may be a three-dimensional sensor for acquiring three-dimensional data. The three-dimensional sensor may be, for example, a range camera, a range sensor, a distance measurement sensor, or the like.

Figure 1:
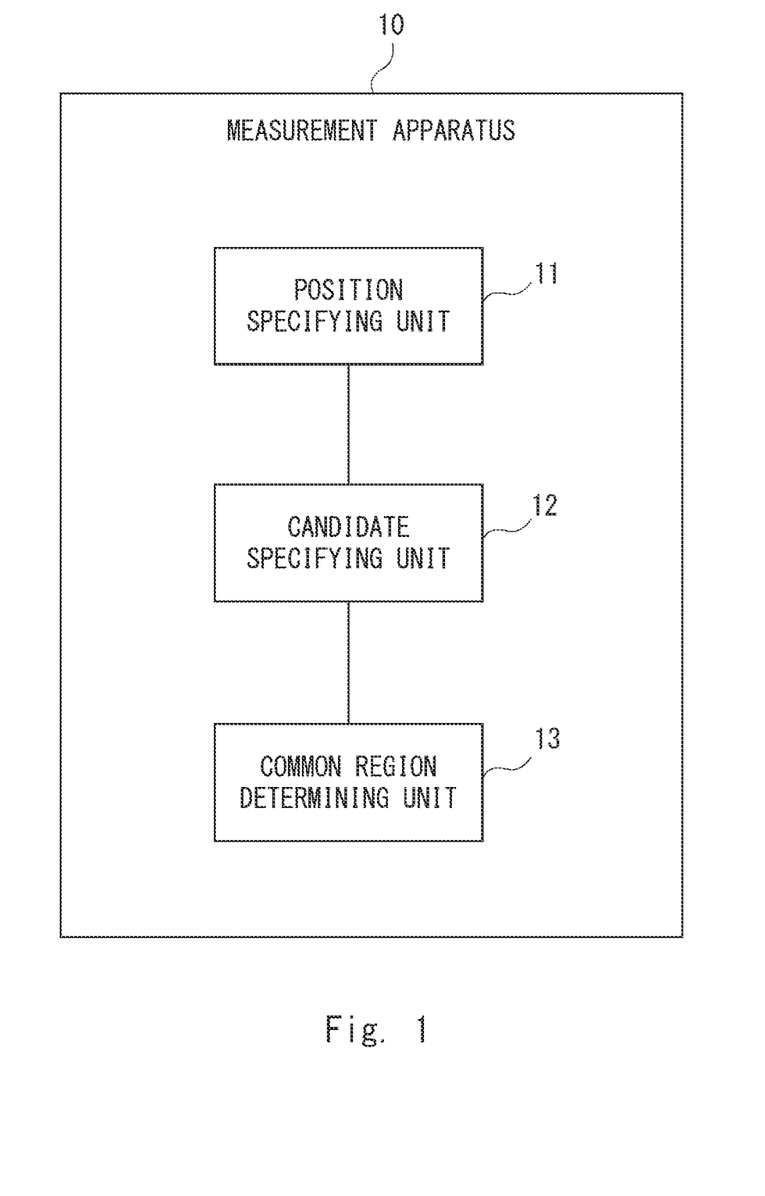
FIG. 1 is a configuration diagram of a measurement apparatus according to a first example embodiment.

The measurement apparatus 10 includes a position specifying unit 11, a candidate specifying unit 12, and a common region determining unit 13. The position specifying unit 11, the candidate specifying unit 12, and the common region determining unit 13 may each be a software or a module whose processing is performed by causing a processor to execute a program stored in a memory. Further, the position specifying unit 11, the candidate specifying unit 12, and the common region determining unit 13 may be hardware such as a circuit or a chip.

The position specifying unit 11 specifies the positions of a plurality of other measurement apparatuses using an apparatus reference coordinate system having the position of the measurement apparatus 10 set as a reference. The apparatus reference coordinate system having the position of the measurement apparatus 10 set as a reference may be, for example, a coordinate system that has the position of the measurement apparatus 10 set as the origin and specifies the position of the object using the X-axis, the Y-axis, and the Z-axis that are orthogonal to one another. Each of the other measurement apparatuses may be, for example, a LiDAR apparatus that is different from the measurement apparatus 10. The position specifying unit 11 may specify the position of each of the other measurement apparatuses using the coordinates of the X-axis, the Y-axis, and the Z-axis of the apparatus reference coordinate system having the position of the measurement apparatus 10 set as a reference.

The candidate specifying unit 12 extracts at least three measurement apparatuses out of the measurement apparatus 10 and the plurality of the other measurement apparatuses. Further, the candidate specifying unit 12 specifies, based on the positions of the extracted measurement apparatuses, the candidate region that serves as a candidate of the common region used for performing alignment of data captured by the measurement apparatus 10 and the plurality of other measurement apparatuses. The candidate specifying unit 12 may extract the measurement apparatus 10 and at least two of the other measurement apparatuses. Alternatively, the candidate specifying unit 12 may extract at least three of the other measurement apparatuses.

The data of the image captured by the measurement apparatus 10 and the plurality of other measurement apparatuses may be point cloud data. The point cloud data may be, for example, data including information about the distance calculated using the TOF method. For instance, the shape of the object is identified using the point cloud data including information about the distance between the measurement apparatus 10 and the object. Further, the point cloud data may be data including three-dimensional data. The point cloud data may be, for example, three-dimensional data including the components of the X-axis, the Y-axis, and the Z-axis that are orthogonal to one another. The three-dimensional data may be rephrased as the coordinate data. The shape of object may be identified using the three-dimensional data.

The point cloud data may be acquired or calculated using, for example, a LiDAR apparatus. Further, the point cloud data may be acquired or calculated using a three-dimensional sensor.

Alignment may be performed, for example, by calculating the coordinates of the point cloud data in the apparatus reference coordinate system having the measurement apparatus 10 set as a reference, the point cloud data being data captured by the other measurement apparatuses. In other words, alignment may be performed by integrating or converting the point cloud data captured by the other measurement apparatuses into the apparatus reference coordinate system having the measurement apparatus 10 set as a reference. By integrating the point cloud data in the plurality of measurement apparatuses with the apparatus reference coordinate system having a certain measurement apparatus set as a reference, the blind spot of the image-capturing target is complemented and further, the positions or the postures of the other measurement apparatuses can also be specified with high precision.

The common region may be a region that includes common data which is included in each data captured by the plurality of measurement apparatuses. The common data may be, for example, data indicating the same structural objects or the same structural components that are included in each data. For instance, alignment may be performed by superimposing the objects, the structural components, or the like that are commonly included in the point cloud data captured by the plurality of measurement apparatuses with one another in the apparatus reference coordinate system having the measurement apparatus 10 set as a reference. The candidate region that serves as a candidate of the common region may be, for example, a region in which there is a high possibility of the common data being included in each data captured by the plurality of measurement apparatuses.

The candidate specifying unit 12 specifies the plurality of candidate regions by changing the combinations of the measurement apparatuses to be extracted.

The common region determining unit 13 determines the common region based on the distribution of the plurality of candidate regions. For instance, the common region determining unit 13 may determine the region for which the number of the duplicate candidate regions exceeds a prescribed number as the common region. Alternatively, the common region determining unit 13 may determine the region with the largest number of the duplicate candidate regions as the common region.

As described above, the measurement apparatus 10 can specify the candidate region that serves as a candidate of the common region by referring to the positions of the other measurement apparatuses specified using the apparatus reference coordinate system having the position of the measurement apparatus 10 set as a reference. Further, the measurement apparatus 10 can determine the common region from out of the candidate regions. As a result, the measurement apparatus 10 can superimpose the common data with one another, the common data being included in each point cloud data when integrating the plurality of point cloud data, whereby it is possible to correctly integrate the point cloud data acquired by each measurement apparatus.

Second Example Embodiment

Figure 2:
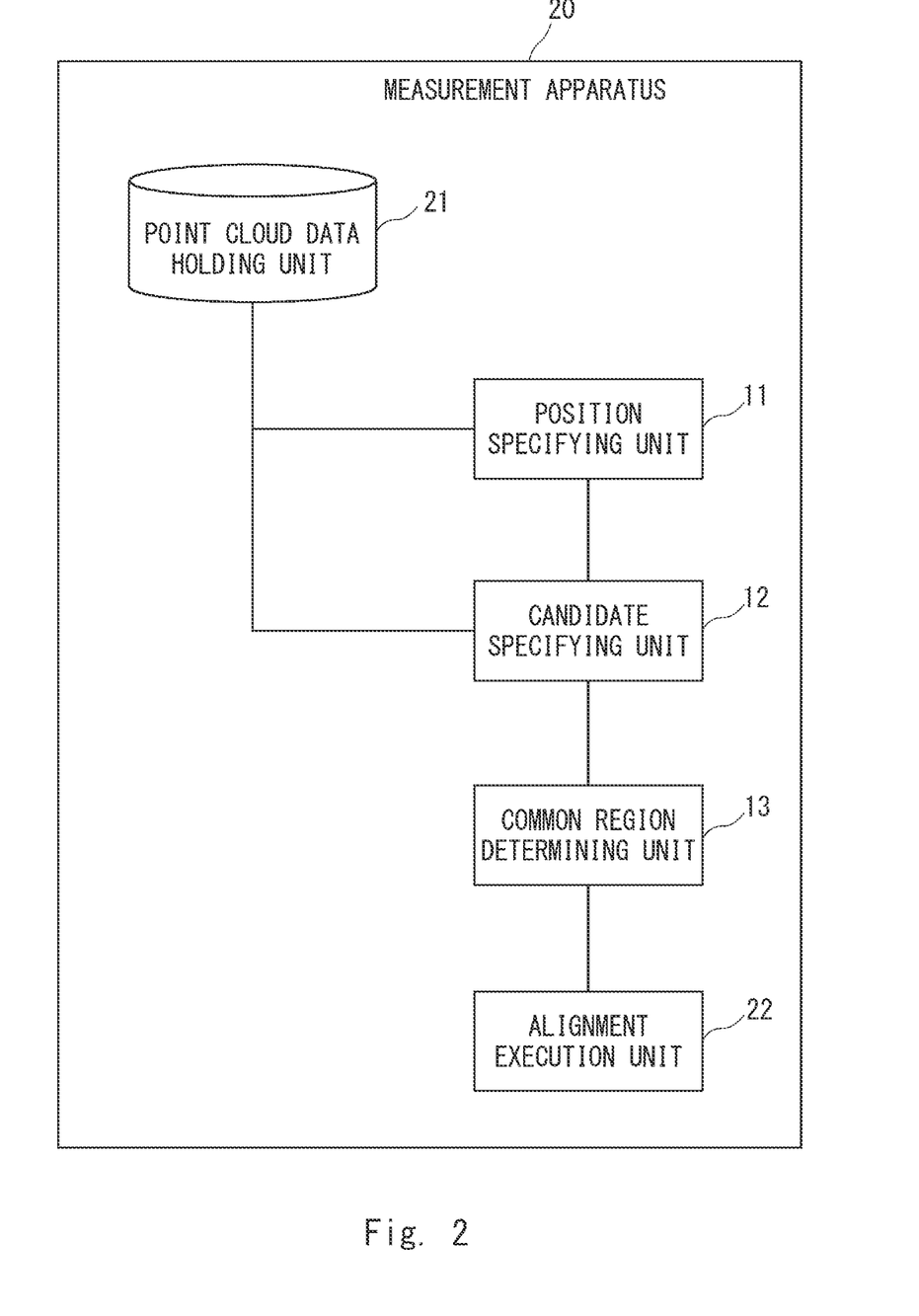
FIG. 2 is a configuration diagram of a measurement apparatus according to a second example embodiment.

Next, a configuration example of the measurement apparatus 20 according to the second example embodiment will be described with reference to FIG. 2. The configuration of the measurement apparatus 20 is obtained by adding a point cloud data holding unit 21 and an alignment execution unit 22 to the measurement apparatus 10 shown in FIG. 1. Hereinbelow, the differences of the configuration shown in FIG. 2 from that shown in FIG. 1 will mainly be described.

The point cloud data holding unit 21 holds the point cloud data acquired by the measurement apparatus 20 and the point cloud data acquired by the other measurement apparatuses. The point cloud data holding unit 21 may be, for example, a memory built in the measurement apparatus 20 or may be a memory that is attachable to the measurement apparatus 20. The point cloud data holding unit 21 may receive the point cloud data acquired by the other measurement apparatuses from the other measurement apparatuses via a wireless communication line or a wired communication line. Wireless communication may be, for example, communication that uses LTE (Long Term Evolution) or the wireless communication standard specified as 5G in 3GPP (3rd Generation Partnership Project). Further, wireless communication may be wireless LAN (Local Area Network) or may be near field communication such as infrared communication, Bluetooth (registered trademark), etc. A wired communication line may be an optical communication line or communication using Ethernet (registered trademark).

The measurement apparatus 20, for instance, moves the camera installed in the measurement apparatus 20 by a predetermined angle in the XY plane of the apparatus reference coordinate system and further moves the camera by a predetermined angle in the plane perpendicular to the XY plane to thereby capture an image of the surroundings of the measurement apparatus 20. The measurement apparatus 20 acquires point cloud data by capturing an image of the surroundings of the measurement apparatus 20 using a camera. That is, the measurement apparatus 20 may perform scanning for the shape of the object in the surroundings thereof by moving, in a predetermined direction, the camera that captures an image of the surroundings of the measurement apparatus 20. The camera installed in the measurement apparatus 20 may be rephrased as a sensor that measures the distance between the measurement apparatus 20 and the object in the surroundings thereof. The point cloud data acquired by the measurement apparatus may be referred to as the distance data indicating the distance between the measurement apparatus and the object in the surroundings thereof.

The point cloud data obtained by capturing an image of the surroundings of the measurement apparatus 20 by a camera of the measurement apparatus 20 may be held in the point cloud data holding unit 21.

The position specifying unit 11 measures the position of the measurement apparatus 20 using the outdoor positioning technique in order to calculate the distance between the position specifying unit 11 and each of the other measurement apparatuses. Further, the position specifying unit 11 acquires, from each of the measurement apparatuses, information about the position of the respective measurement apparatuses measured using the outdoor positioning technique. The outdoor positioning technique may be, for example, positioning performed using the GPS (Global Positioning System), radio determination, or geomagnetic positioning. The position specifying unit 11 calculates the distance between the measurement apparatus 20 and each of the other measurement apparatuses with reference to the position of the measurement apparatus 20 and the positions of the other measurement apparatuses specified using the outdoor positioning technique. Further, the position specifying unit 11 may calculate the distance between the other measurement apparatuses. The position of the measurement apparatus specified using the outdoor positioning technique may be the position represented by the coordinates that are used in the world geodetic system. The coordinates used in the world geodetic system may be rephrased as the world coordinates.

Figure 3:
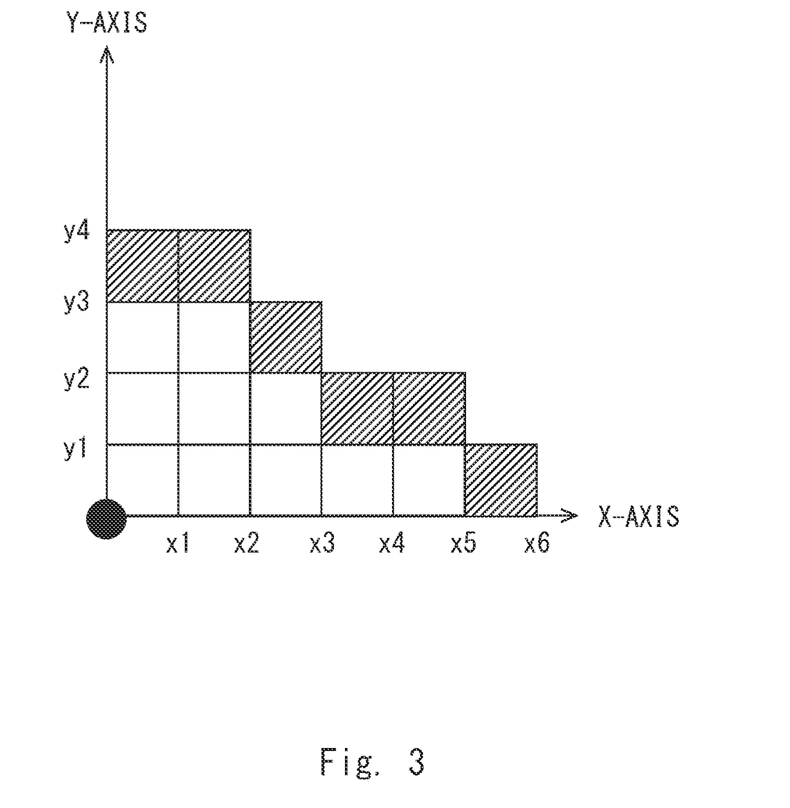
FIG. 3 is a diagram for explaining an object presence/absence observation map according to the second example embodiment.

Further, the position specifying unit 11 calculates or generates an object presence/absence observation map using the point cloud data measured by the measurement apparatus 20. The object presence/absence observation map will be described with reference to FIG. 3. The black circle shown in FIG. 3 indicates the position of the measurement apparatus 20 which is located at the origin of the X-axis and the Y-axis. Further, although not shown in FIG. 3, there is a Z-axis in a direction perpendicular to the XY plane and at a position of the origin of the X-axis and the Y-axis. That is, FIG. 3 shows a three-dimensional diagram that includes a Z-axis in a direction perpendicular to the XY plane. When the XY plane indicates the ground surface, the measurement apparatus 20 may be located at the origin of the X-axis, the Y-axis, and the Z-axis. Alternatively, when the XY plane indicates the ground surface, the measurement apparatus 20 may be located at the origin of the X-axis and the Y-axis and at a position of an arbitrary value of the Z-axis.

Further, x1 to x5 indicate the values of the X-axis, and y1 to y4 indicate the values of the Y-axis. It is assumed that the value increases from x1 to x5 and increases from y1 to y4. Each shaded region in FIG. 3 shows the position where an object is present. That is, the shaded region in FIG. 3 indicates a region where the point cloud data acquired by the measurement apparatus 20 is present. The unshaded square region in FIG. 3 is a region where the object is not present. That is, the light emitted from the measurement apparatus 20 passes through the unshaded region in FIG. 3 and is reflected by the object present in the shaded region. The measurement apparatus 20 receives the reflected light. Further, for example, the light emitted from the measurement apparatus 20 is blocked by the object present in the region from the origin to x2 and from y3 to y4 and therefore does not reach the region of the value from the origin to x2 and greater than y4. Therefore, the region of the value from the origin to x2 and greater than y4 can be said as an unknown region that is unclear as to whether an object is present therein. That is, the region where the light emitted from the measurement apparatus 20 does not reach due to the light being blocked by an object can be said as being the region that is unclear as to whether or not an object is present. In FIG. 3, the region that is unclear as to whether or not an object is present is a region excluding the shaded region and the unshaded square region.

Each of the measurement apparatuses other than the measurement apparatus 20 also generates an object presence/absence observation map like the measurement apparatus 20. The position specifying unit 11 acquires the object presence/absence observation map from each of the other measurement apparatuses. Alternatively, the position specifying unit 11 may generate an object presence/absence observation map for each of the other measurement apparatuses using the point cloud data acquired from the respective other measurement apparatuses. In this case, each object presence/absence observation map is generated using the coordinates of the apparatus reference coordinate system having the positions of the respective measurement apparatuses set as a reference.

Figure 4:
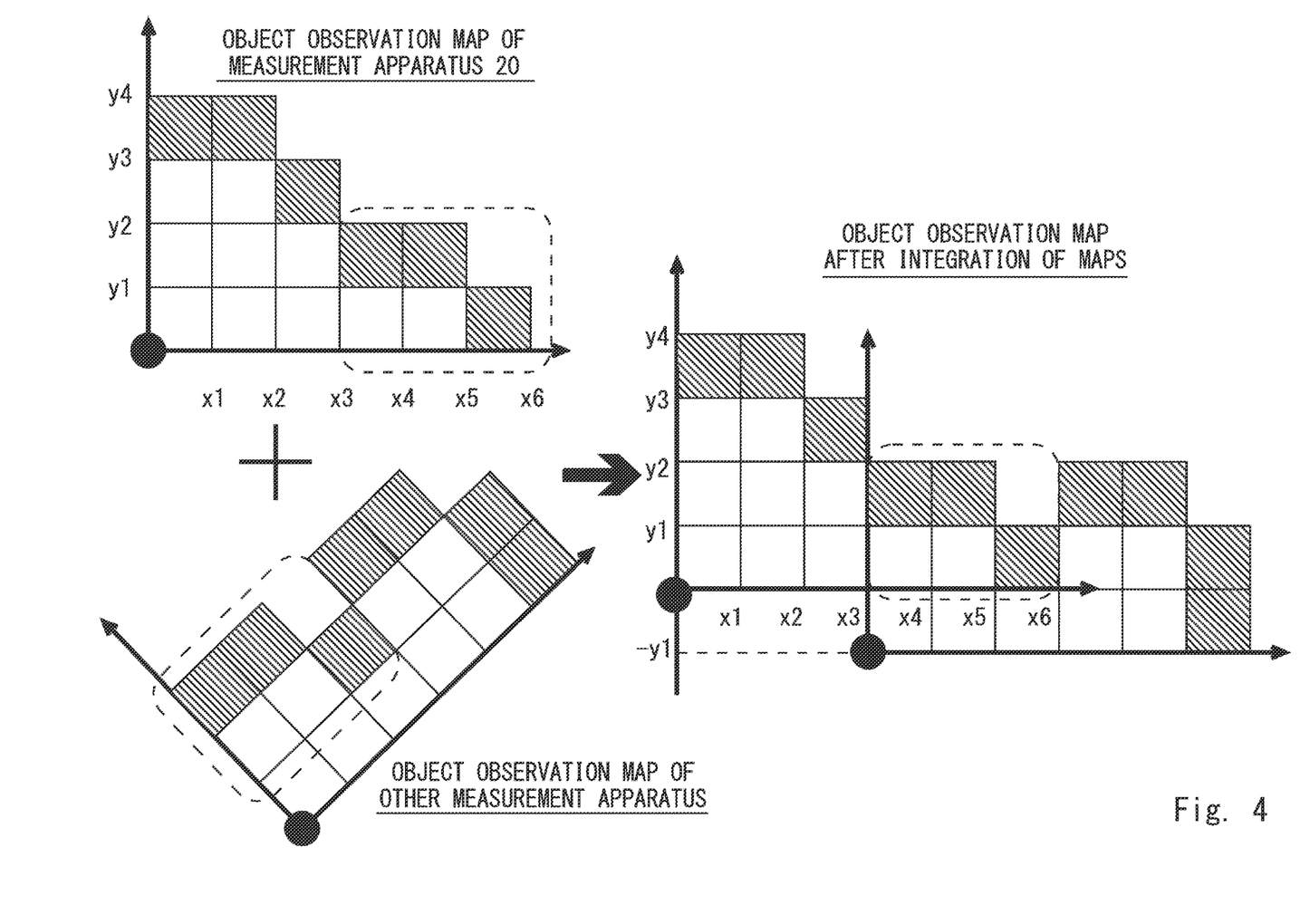
FIG. 4 is a diagram for explaining processing of specifying the position of the measurement apparatus according to the second example embodiment.

Further, the position specifying unit 11 specifies the position of each of the other measurement apparatuses in the apparatus reference coordinate system having the measurement apparatus 20 set as a reference by referring to the distance to each of the other measurement apparatuses and the object presence/absence observation map in the respective other measurement apparatuses. The processing of specifying the position of each of the other measurement apparatuses will be described with reference to FIG. 4. FIG. 4 shows integration of the object observation map in the measurement apparatus 20 and the object observation map in one of the other measurement apparatuses. Specifically, the region surrounded by the dotted lines in the object observation map of the measurement apparatus 20 and the region surrounded by the dotted lines in the object observation map of the other measurement apparatus have the identical features. The identical features may be that the distribution of the areas where the objects are present in the two regions match. The apparatus reference coordinate system used for the object observation map of the measurement apparatus 20 and the apparatus reference coordinate system used for the object observation map of the other measurement apparatus are different. Therefore, in FIG. 4, it is shown that the directions of X-axis and Y-axis do not match between the respective apparatus reference coordinate systems.

The position specifying unit 11 arranges the object observation map of the other measurement apparatus at a position distant from the origin by the distance between the measurement apparatus 20 and the other measurement apparatus. Further, the position specifying unit 11 rotates the object observation map of the measurement apparatus 20 and the object observation map of the other measurement apparatus around the Z-axis so that the regions surrounded by the dotted lines in the respective object observation maps are made to coincide with each other. Alternatively, the position specifying unit 11 arranges the origin of the object observation map of the other measurement apparatus along a circumference of a circle whose center is set at the origin of the apparatus coordinate system having the position of the measurement apparatus 20 set as a reference and whose radius is equal to the distance between the measurement apparatus 20 and the other measurement apparatus. Further, the position specifying unit 11 may move the object observation map of the other measurement apparatus along the circumference of the circle. In this way, the position specifying unit 11 may make the region surrounded by the dotted lines in the object observation map of the measurement apparatus 20 and the region surrounded by the dotted lines in the object observation map of the other measurement apparatus to match each other. At this time, the position specifying unit 11 may move the object observation map of the other measurement apparatus along the circumference of the circle while rotating the object observation map about the Z-axis.

The position specifying unit 11 specifies the presence of the other measurement apparatus at a position (x3, −y1) in the apparatus reference coordinate system having the position of the measurement apparatus 20 set as a reference when the region surround by the dotted lines are made to coincide with each other like the object observation map after the integration of the maps shown in FIG. 4. Further, the position specifying unit 11 moves the object observation map after the integration of the maps in the Z-axis direction and makes the areas where the object is present to coincide with each other thereby the values of the coordinates of the Z-axis indicating the position where the other measurement apparatus is present are specified.

The position specifying unit 11 repeats the processing of specifying the position of the other measurement apparatus and specifies the position of the plurality of other measurement apparatuses in the apparatus reference coordinate system having the position of the measurement apparatus 20 set as a reference.

Figure 5:
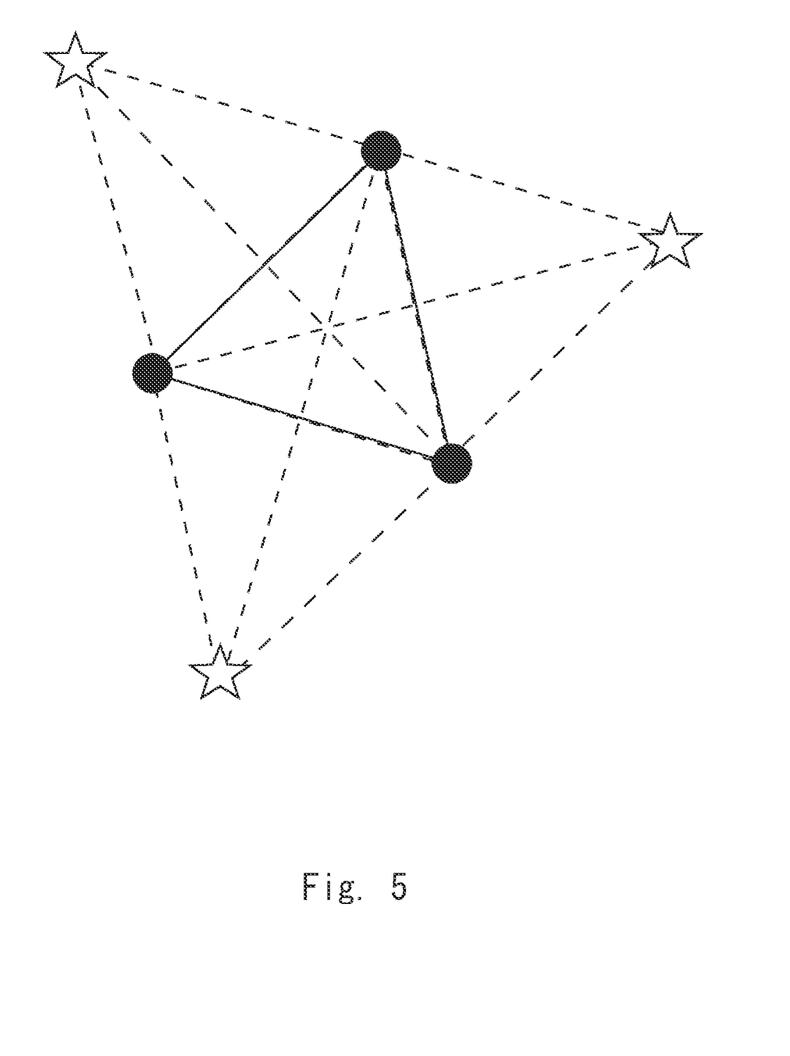
FIG. 5 is a diagram showing a candidate region that serves as a candidate of a common region according to the second example embodiment.

The candidate specifying unit 12 selects or extracts three measurement apparatus out of the measurement apparatus 20 and the plurality of measurement apparatuses whose positions are specified and generates a triangle composed of the black circles shown in FIG. 5. The vertices of the triangle are the positions of the measurement apparatuses and the triangle shows the positional relationship of the three measurement apparatuses. For example, the candidate specifying unit 12 may extract the three neighboring measurement apparatuses. The black circles shown in FIG. 5 indicate the extracted measurement apparatuses. The black circles in FIG. 5 specify the positions of the measurement apparatuses using the apparatus reference coordinate system having the position of the measurement apparatus 20 set as a reference. The star marks in FIG. 5 indicate the candidate region that serves as a candidate of the common region. Hereinbelow, the method of specifying the candidate region will be described.

For example, the candidate region may be a region including a symmetrical position of the vertex that is different from the end point of the side serving as the reference, the reference being one side of the triangle. The candidate region may be a region of a circle centered at the symmetrical position of the vertex and having a predetermined radius or may be a region including a prescribed range centered at the symmetrical position of the vertex. In the example shown in FIG. 5, the three candidate regions including the symmetrical positions of the respective three vertices are shown.

The candidate specifying unit 12 extracts the combinations of the measurement apparatuses that are different from combination of the three measurement apparatuses shown in FIG. 5 and specifies the candidate region for the respective combinations. The combinations of the measurement apparatuses that are different from the combination of the three measurement apparatuses shown in FIG. 5 may include one or two measurement apparatuses out of the three measurement apparatuses shown in FIG. 5 or all three measurement apparatuses may be those that are newly extracted.

Further, the candidate specifying unit 12 is not limited to the method using the symmetrical positions of the vertices as a method of specifying the candidate region. For example, the candidate specifying unit 12 may set the region including the prescribed range centered at the position of the vertex that differs from the end point of the side serving as the reference folded at the side serving as the reference as the candidate region. Alternatively, the candidate specifying unit 12 may set the region including the prescribed range centered at an arbitrary position on an extension of the vertical line from a vertex different from the end point of the side of the triangle serving as the reference to the side of the triangle serving as the reference. Alternatively, the candidate specifying unit 12 may set the region including the prescribed range centered at an arbitrary position on an extension of the straight line from a vertex different from the end point of the side of the triangle serving as the reference to the midpoint of the side of the triangle serving as the reference. Alternatively, the candidate specifying unit 12 may set the region including the arbitrary position within the region between the two sides of triangle extending from the measurement apparatus that is located at the vertex of the triangle.

The common region determining unit 13 determines the common region based on the candidate regions specified by the candidate specifying unit 12. For example, the common region determining unit 13 may determine the region in which the candidate regions are most concentrated as the common region. Concentration of the candidate regions refers to, for instance, presence of a plurality of candidate regions within a prescribed region. That is, even the candidate regions do not perfectly match one another, if there are plurality of candidate regions within the prescribed region, it can be said that a plurality of candidate regions are concentrated within the prescribed region. The region in which the candidate regions are most concentrated may be a region in which there are the largest number of the candidate regions compared to the other regions. Concentration may be rephrased as duplication.

Alternatively, the common region determining unit 13 may determine the region in which the candidate regions are concentrated by a number greater than the predetermined threshold value as the common region. In this case, the common region determining unit 13 may determine one or more regions as the common region.

The alignment execution unit 22 performs alignment of the point cloud data acquired by each of the measurement apparatuses using the common regions included in the respective point cloud data. For example, the alignment execution unit 22 performs alignment such that the objects included in the common region are superimposed with one another. Further the alignment execution unit 22 can perform alignment of the point cloud data over a range wider that the common region by applying the moving distance of the point cloud data when the objects included in the common region are superimposed with one another and the like to the point cloud data other that of the common region.

Figure 6:
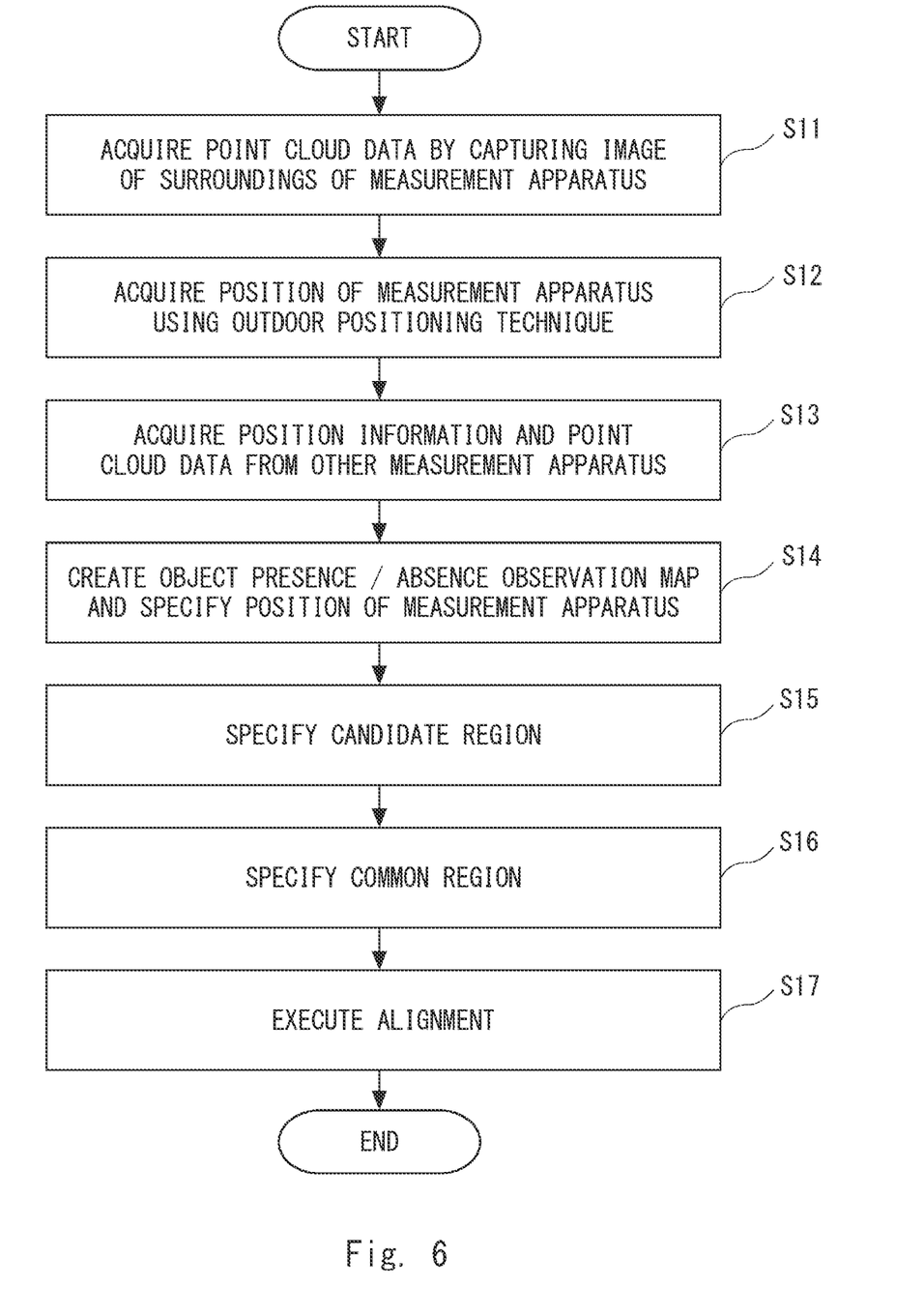
FIG. 6 is a diagram showing a flow of alignment processing according to the second example embodiment.

Next, the flow of the alignment process according to the second example embodiment with reference to FIG. 6 will be described. First, the measurement apparatus 20 acquires the point cloud data by capturing an image of the surroundings of the measurement apparatus 20 using a camera installed in the measurement apparatus (S11). The measurement apparatus 20 picks up an image of the 360-degree region of the plane that is centered at the measurement apparatus 20 and that is substantially parallel to the ground surface and further picks up an image of the 360-degree region of the plane that is substantially perpendicular to the ground surface. That is, the measurement apparatus 20 may pick up an image of the region within the spherical surface centered at the measurement apparatus 20. Alternatively, the measurement apparatus 20 may pick up an image of a part of the region within the spherical surface centered at the measurement apparatus 20.

Next, the position specifying unit 11 acquires the position of the measurement apparatus 20 using the outdoor positioning technique (S12). For example, the position specifying unit 11 may specify, using the outdoor positioning technique, the position of the measurement apparatus 20 represented by the coordinates that are used in the world geodetic system.

Next, the position specifying unit 11 acquires, from the other measurement apparatuses, the position information and the point cloud data acquired or measured by the respective measurement apparatuses (S13). The position specifying unit 11 acquires the position information acquired by the other measurement apparatuses as the position represented by the coordinates that are used in the world geodetic system. Further, the position specifying unit 11 acquires the point cloud data acquired by the other measurement apparatuses as the position represented by the coordinates used in the apparatus reference coordinate system having the positions of the respective measurement apparatuses set as a reference.

Next, the position specifying unit 11 calculates the distance between the position of the measurement apparatus 20 and the position of the other measurement apparatus represented by the coordinates used in the world geodetic system. Further, the position specifying unit 11 creates an object presence/absence observation map using the point cloud data acquired by each of the measurement apparatus 20 and the other measurement apparatuses and specifies the positions of the measurement apparatus 20 and the other measurement apparatuses (S14). The position specifying unit 11 arranges each of the other measurement apparatuses at a position distant from the position of the measurement apparatus 20 by the calculated distance and superimposes the object observation map of the measurement apparatus 20 and the object presence/absence observation map of each of the other measurement apparatuses with one another. In this way, the position specifying unit 11 specifies the position of each of the other measurement apparatuses in the apparatus reference coordinate system having the position of the measurement apparatus 20 set as a reference.

Next, the candidate specifying unit 12 selects, for example, three measurement apparatuses specified in the apparatus reference coordinate system having the position of the measurement apparatus 20 set as a reference and specifies the candidate region based on the positions of the selected three measurement apparatuses (S15). The candidate specifying unit 12 changes the combinations of the measurement apparatuses to be selected and specifies the plurality of the candidate regions.

Next, the common region determining unit 13 determines the common region based on the distribution of the candidate region (S16). Next, the alignment execution unit 22 executes alignment using the common region of the point cloud data acquired by respective measurement apparatuses (S17). The alignment execution unit 22 executes alignment by superimposing the position, the orientation, and the like of the object commonly included in the common region of the each of the measurement apparatuses with one another.

As described above, the measurement apparatus 20 according to the second example embodiment can specify, using the object observation map, the position of each of the other measurement apparatuses with high precision compared to the case where the object observation map is not used. Further, the measurement apparatus 20 can specify the candidate region that serves as a candidate of the candidate region based on the positions of the measurement apparatus 20 and the other measurement apparatuses and specify the common region based on the distribution of the candidate region.

By this configuration, the measurement apparatus 20 can be improved in its possibility of selecting the region that commonly includes the same object. Therefore, the measurement apparatus 20 can correctly perform alignment by referring the object that is commonly included in each of the point cloud data.

Further, the position specifying unit 11 of the measurement apparatus 20 may specify the position of each of the other measurement apparatuses using the point cloud data obtained when capturing an image of each of the other measurement apparatuses. The point cloud data indicates the coordinates in the apparatus reference system having the position of the measurement apparatus 20 set as a reference. Therefore, the position of other measurement apparatus included in the point cloud data is also represented by the coordinates used in the apparatus reference coordinate system having the position of the measurement apparatus 20 set as a reference. In this case, the position specifying unit 11 may omit the processing of specifying the position of each of the other measurement apparatuses by referring to the object presence/absence observation map.

Third Example Embodiment

Figure 7:
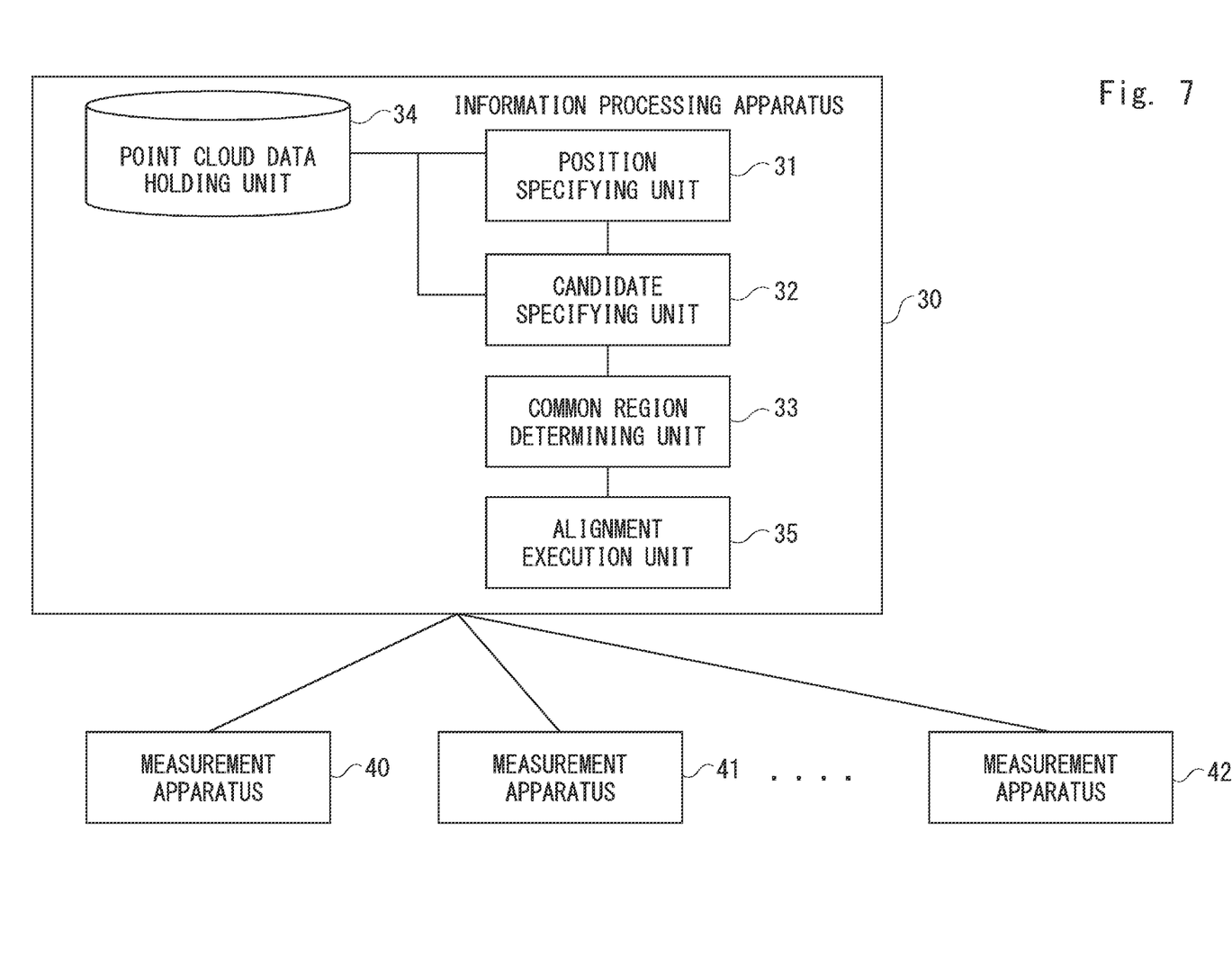
FIG. 7 is a configuration diagram of a communication system according to a third example embodiment.

Next, a configuration example of a communication system according to a third example embodiment will be described with reference to FIG. 7. The communication system of FIG. 7 includes an information processing apparatus 30, a measurement apparatus 40, a measurement apparatus 41, and a measurement apparatus 42. While FIG. 7 shows an example in which there are three measurement apparatuses, the number of the measurement apparatuses may be four or more. The information processing apparatus 30 may be a computer apparatus that operates by causing a processor to execute a program stored in a memory.

The information processing apparatus 30 performs communication with the measurement apparatus 40, the measurement apparatus 41, and the measurement apparatus 42. The information processing apparatus 30 may perform communication with the measurement apparatus 40, the measurement apparatus 41, and the measurement apparatus 42 via wireless communication lines or may perform communication via wired communication lines. Wireless communication may be, for example, communication that uses LTE (Long Term Evolution) or the wireless communication standard specified as 5G in 3GPP. Further, wireless communication may be wireless LAN (Local Area Network) or may be near field communication such as infrared communication, Bluetooth (registered trademark), etc. A wired communication line may be an optical communication line or communication using Ethernet (registered trademark). Alternatively, the information processing apparatus 30 may perform communication with only the measurement apparatus 40. In this case, the measurement apparatus 40 may collect data by performing communication with the measurement apparatus 41 and the measurement apparatus 42 and transmit the collected data to the information processing apparatus 30.

Next, a configuration example of the information processing apparatus 30 will be described. The information processing apparatus 30 includes a position specifying unit 31, a candidate specifying unit 32, a common region determining unit 33, a point cloud data holding unit 34, and an alignment execution unit 35. The position specifying unit 31, the candidate specifying unit 32, the common region determining unit 33, the point cloud data holding unit 34, and the alignment execution unit 35 correspond to the position specifying unit 11, the candidate specifying unit 12, the common region determining unit 13, the point cloud data holding unit 21, and the alignment execution unit 22, respectively of the measurement apparatus 20 shown in FIG. 2. That is, the information processing apparatus 30 executes the processing related to specifying of the position, specifying of the candidate region, specifying of the common region, and alignment that were performed in the measurement apparatus of FIG. 2. The operations and the functions of the candidate specifying unit 32, the common region determining unit 33, the point cloud data holding unit 34, and the alignment execution unit 35 are the same as those of the position specifying unit 11, the candidate specifying unit 12, the common region determining unit 13, the point cloud data holding unit 21, and the alignment execution unit 22, respectively and thus detailed descriptions thereof are omitted.

The position specifying unit 31 specifies the positions of the measurement apparatus 40, the measurement apparatus 41, and the measurement apparatus 42 using the apparatus reference coordinate system having the position of the information processing apparatus 30 set as a reference. Specifically, the position specifying unit 31 arranges the measurement apparatus 41 at a position distant from the measurement apparatus 40 by a distance between the measurement apparatus 40 and the measurement apparatus 41. Further, the position specifying unit 31 superimposes the object presence/absence observation map of the measurement apparatus 40 the object presence/absence observation map of the measurement apparatus 41 with each another and specified the position of the measurement apparatus 40 and the measurement apparatus 41 in the apparatus reference coordinate system having the information processing apparatus 30 set as a reference. Alternatively, the position specifying unit 31 may use the apparatus reference coordinate system having the position of any one of the measurement apparatus 40, the measurement apparatus 41, or the measurement apparatus 42 set as a reference.

As described above, the information processing apparatus 30 can reduce the processing load in the measurement apparatus by executing, in place of the measurement apparatus, the processing related to specifying of the position, specifying of the candidate region, specifying of the common region, and alignment. The measurement apparatus may be, for example, a LiDAR apparatus or the like, and often has lower processing capacity than a general server or the like. Therefore, by reducing the processing load of the measurement apparatus, it is possible to reduce the risk of failure that may occur in the measurement apparatus.

Figure 8:
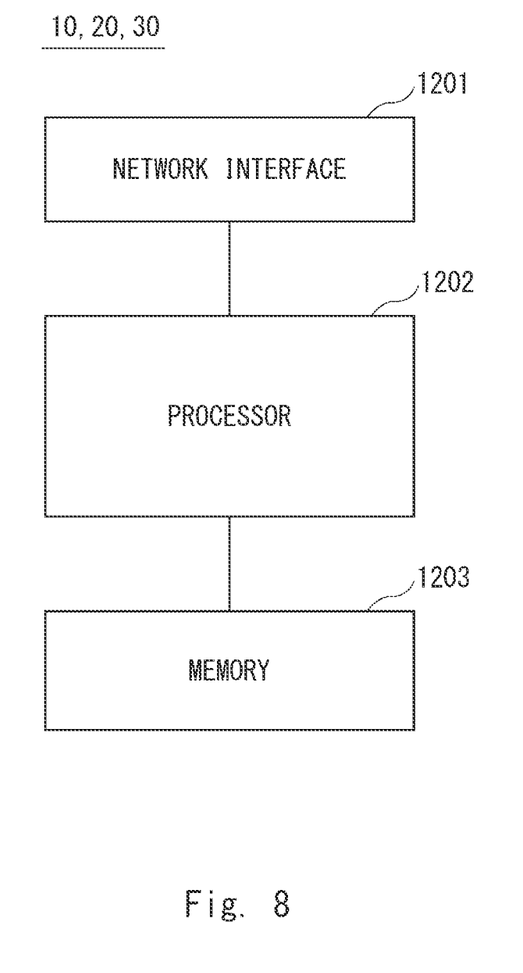
FIG. 8 is a configuration diagram of a measurement apparatus and an information processing apparatus according to each example embodiment.

FIG. 8 is a block diagram of showing a configuration example of each of the measurement apparatus 10, the measurement apparatus 20, and the information processing apparatus 30 (hereinbelow referred to as the measurement apparatus 10 etc.). Referring to FIG. 8, the measurement apparatus 10 etc. include a network interface 1201, a processor 1202, and a memory 1203. The network interface 1201 is used for performing communication with a network node (e.g., eNB, MME, P-GW). The network interface 1201 may include, for example, the network interface card (NIC) in compliance with IEEE 802.3 series.

The processor 1202 performs processing of the measurement apparatus 10 etc. described using the flowcharts in the aforementioned example embodiments by reading out and executing a software (a computer program) from the memory 1203. The processor 1202 may be, for example, a microprocessor, a MPU, or a CPU. The processor 1202 may include a plurality of processors.

The memory 1203 may be configured of a combination of a volatile memory and a non-volatile memory. The memory 1203 may include a storage disposed distant from the processor 1202. In this case, the processor 1202 may access the memory 1203 via a non-illustrated I/O interface.

In the example of FIG. 8, the memory 1203 may be used to store software modules. The processor 1202 can perform processing of the measurement apparatus 10 and the like described in the aforementioned example embodiments by reading out the software modules from the memory 1203 and executing them.

As described with reference to FIG. 8, each processor included in the measurement apparatus 10 etc. in the aforementioned example embodiments executes one or a plurality of programs in the instruction group for causing a computer to execute the algorithm described with reference to the drawings.

In the aforementioned examples, the program can be stored and provided to a computer using any type of non-transitory computer readable media. Non-transitory computer readable media include any type of tangible storage media. Examples of non-transitory computer readable media include magnetic storage media (e.g. floppy disks, magnetic tapes, hard disk drives, etc.), optical magnetic storage media (e.g. magneto-optical disks), CD-ROM (Read Only Memory), CD-R, CD-R/W, and semiconductor memories (e.g. mask ROM, PROM (programmable ROM), EPROM (Erasable PROM), flash ROM, RAM (random access memory)). The program may be provided to a computer using any type of transitory computer readable media. Examples of transitory computer readable media include electric signals, optical signals, and electromagnetic waves. Transitory computer readable media can provide the program to a computer via a wired communication line such as electric wires and optical fibers or a wireless communication line.

Note that the present disclosure is not limited to the above-described example embodiments, and can be appropriately changed without departing from the spirit of the present disclosure.

The whole or part of the example embodiments disclosed above can be described as, but not limited to, the following supplementary notes.

(Supplementary Node 1)

A measurement apparatus comprising:

a position specifying unit configured to specify, using an apparatus reference coordinate system having a position of the measurement apparatus set as a reference, a position of each of a plurality of other measurement apparatuses;

a candidate specifying unit configured to extract at least three measurement apparatuses out of the measurement apparatus and the plurality of the other measurement apparatuses and to specify, based on the positions of the extracted measurement apparatuses, a candidate region that serves as a candidate of a common region referred to in performing alignment of data captured by the measurement apparatus and the plurality of the other measurement apparatuses; and a common region determining unit configured to determine the common region based on the distribution of the plurality of the candidate regions obtained by changing combinations of the measurement apparatuses to be extracted.

(Supplementary Node 2)

The measurement apparatus described in Supplementary note 1, wherein the position specifying unit is configured to specify the positions of the plurality of the other measurement apparatuses using first distance data indicating a distance from the measurement apparatus to an object in the surroundings thereof specified using data captured by the measurement apparatus, a second distance data acquired at each of the plurality of the other measurement apparatuses, and a third distance data indicating a distance between the measurement apparatus and the plurality of the other measurement apparatuses.

(Supplementary Node 3)

The measurement apparatus described in Supplementary note 2, wherein the position specifying unit is configured to specify the positions of the plurality of the other measurement apparatuses by superimposing the second distance data on a position distant from the measurement apparatus by a distance specified in the third distance data.

(Supplementary Node 4)

The measurement apparatus described in Supplementary note 1, wherein the position specifying unit is configured to specify the positions of the plurality of the other measurement apparatuses using data including the plurality of the other measurement apparatuses captured by the measurement apparatus.

(Supplementary Node 5)

The measurement apparatus described in any one of Supplementary notes 1 to 4, wherein the candidate specifying unit is configured to specify the candidate region based on a shape of a triangle in which the positions of the three measurement apparatuses in the apparatus reference system are vertices thereof.

(Supplementary Node 6)

The measurement apparatus described in Supplementary note 5, wherein the candidate specifying unit is configured to set a region including a symmetrical position of a third vertex as the candidate region with reference to a line connecting a first vertex and a second vertex included in the triangle.

(Supplementary Node 7)

The measurement apparatus described in Supplementary note 5, wherein the candidate specifying unit is configured to set a region including an arbitrary point on a straight line connecting a midpoint of a straight line connecting the second vertex and the third vertex with the first vertex, the first vertex included in the triangle being an end point, as the candidate region.

(Supplementary Node 8)

The measurement apparatus described in any one of Supplementary notes 1 to 7, wherein the common region determining unit is configured to set a region in which the number of the duplicate candidate regions is greater than a prescribed number as the common region.

(Supplementary Node 9)

The measurement apparatus described in any one of Supplementary notes 1 to 8, wherein the captured data is point cloud data.

(Supplementary Node 10)

The measurement apparatus described in Supplementary note 2, wherein the position specifying unit is configured to generate an object presence/absence observation map indicating whether there is an object present in the surroundings of the measurement apparatus using point cloud data, which is data captured by the measurement apparatus, and the first distance data indicates a distance from the measurement apparatus to the object indicated in the object present/absence observation map and the second distance data indicates a distance from the other measurement apparatuses to the object indicated in the object presence/absence observation map generated by the other measurement apparatuses.

(Supplementary Node 11)

An information processing apparatus for collecting information from a plurality of measurement apparatuses, comprising:

a communication unit configured to receive first distance data indicating a distance from each of the plurality of the measurement apparatuses to an object in the surroundings thereof specified by the respective measurement apparatuses;

a position specifying unit configured to specify a position of each of the plurality of the measurement apparatuses using the first distance data and third distance data indicating a distance between the apparatuses included in the plurality of the measurement apparatuses;

a candidate specifying unit configured to extract at least three measurement apparatuses out of the plurality of the measurement apparatuses and to specify, based on the positions of the extracted measurement apparatuses, a candidate region that serves as a candidate of a common region referred to in performing alignment of data captured by the plurality of the measurement apparatuses; and a common region determining unit configured to determine the common region based on distribution of a plurality of the candidate regions obtained by changing combinations of the measurement apparatuses to be extracted.

(Supplementary Node 12)

The information processing apparatus described in Supplementary note 11, wherein the position specifying unit is configured to specify positions of the first measurement apparatus and the second measurement apparatus by superimposing the first distance data of a second measurement apparatus included in the plurality of the measurement apparatuses on a position distant from the first measurement apparatus included in the plurality of the measurement apparatuses by a distance specified in the third distance data in the apparatus reference coordinate system having the position of the information processing apparatus set as a reference.

(Supplementary Node 13)

A data determining method performed in a measurement apparatus, the method comprising:

specifying, using an apparatus reference coordinate system having a position of the measurement apparatus set as a reference, a position of each of a plurality of other measurement apparatuses;

extracting at least three measurement apparatuses out of the measurement apparatus and the plurality of the other measurement apparatuses;

specifying, based on the positions of the extracted measurement apparatuses, a candidate region that serves as a candidate of a common region referred to in performing alignment of data captured by the measurement apparatus and the plurality of the other measurement apparatuses; and determining the common region based on the distribution of the plurality of the candidate regions obtained by changing combinations of the measurement apparatuses to be extracted.

(Supplementary Node 14)

A program for causing a computer apparatus to execute the processes of:

specifying, using an apparatus reference coordinate system having a position of the measurement apparatus set as a reference, a position of each of a plurality of other measurement apparatuses;

extracting at least three measurement apparatuses out of the measurement apparatus and the plurality of the other measurement apparatuses;

specifying, based on the positions of the extracted measurement apparatuses, a candidate region that serves as a candidate of a common region referred to in performing alignment of data captured by the measurement apparatus and the plurality of the other measurement apparatuses; and determining the common region based on the distribution of the plurality of the candidate regions obtained by changing combinations of the measurement apparatuses to be extracted.

Note that the present disclosure is not limited to the above-described example embodiments, and can be appropriately changed without departing from the spirit of the present disclosure.

REFERENCE SIGNS LIST

10 MEASUREMENT APPARATUS
11 POSITION SPECIFYING UNIT
12 CANDIDATE SPECIFYING UNIT
13 COMMON REGION DETERMINING UNIT
20 MEASUREMENT APPARATUS
21 POINT CLOUD DATA HOLDING UNIT
22 ALIGNMENT EXECUTION UNIT
30 INFORMATION PROCESSING APPARATUS
31 POSITION SPECIFYING UNIT
32 CANDIDATE SPECIFYING UNIT
33 COMMON REGION DETERMINING UNIT
34 POINT CLOUD DATA HOLDING UNIT
35 ALIGNMENT EXECUTION UNIT
40 MEASUREMENT APPARATUS
41 MEASUREMENT APPARATUS
42 MEASUREMENT APPARATUS

What is claimed is:

1. A measurement apparatus comprising:
at least one memory storing instructions, and
at least one processor configured to execute the instructions to;
specify, using an apparatus reference coordinate system having a position of the measurement apparatus set as a reference, a position of each of a plurality of other measurement apparatuses;
extract at least three measurement apparatuses out of the measurement apparatus and the plurality of the other measurement apparatuses and to specify, based on the positions of the extracted measurement apparatuses, a candidate region that serves as a candidate of a common region referred to in performing alignment of data captured by the measurement apparatus and the plurality of the other measurement apparatuses; and
determine the common region based on the distribution of the plurality of the candidate regions obtained by changing combinations of the measurement apparatuses to be extracted.

2. The measurement apparatus according to claim 1, wherein the at least one processor is further configured to execute the instructions to specify the positions of the plurality of the other measurement apparatuses using first distance data indicating a distance from the measurement apparatus to an object in the surroundings thereof specified using data captured by the measurement apparatus, a second distance data acquired at each of the plurality of the other measurement apparatuses, and a third distance data indicating a distance between the measurement apparatus and the plurality of the other measurement apparatuses.

3. The measurement apparatus according to claim 2, wherein the at least one processor is further configured to execute the instructions to specify the positions of the plurality of the other measurement apparatuses by superimposing the second distance data on a position distant from the measurement apparatus by a distance specified in the third distance data.

4. The measurement apparatus according to claim 2, wherein
the at least one processor is further configured to execute the instructions to generate an object presence/absence observation map indicating whether there is an object present in the surroundings of the measurement apparatus using point cloud data captured by the measurement apparatus, and
the first distance data indicates a distance from the measurement apparatus to the object indicated in the object present/absence observation map and the second distance data indicates a distance from the other measurement apparatuses to the object indicated in the object presence/absence observation map generated by the other measurement apparatuses.

5. The measurement apparatus according to claim 1, wherein the at least one processor is further configured to execute the instructions to specify the positions of the plurality of the other measurement apparatuses using data including the plurality of the other measurement apparatuses captured by the measurement apparatus.

6. The measurement apparatus according to claim 1, wherein the at least one processor is further configured to execute the instructions to specify the candidate region based on a shape of a triangle in which the positions of the three measurement apparatuses in the apparatus reference coordinate system are vertices thereof.

7. The measurement apparatus according to claim 6, wherein the at least one processor is further configured to execute the instructions to set a region including a symmetrical position of a third vertex as the candidate region with reference to a line connecting a first vertex and a second vertex included in the triangle.

8. The measurement apparatus according to claim 6, wherein the at least one processor is further configured to execute the instructions to set a region including an arbitrary point on a straight line connecting a midpoint of a straight line connecting the second vertex and the third vertex with the first vertex, the first vertex included in the triangle being an end point, as the candidate region.

9. The measurement apparatus according to claim 1, wherein the at least one processor is further configured to execute the instructions to set a region in which the number of the duplicate candidate regions is greater than a prescribed number as the common region.

10. The measurement apparatus according to claim 1, wherein the captured data is point cloud data.

11. An information processing apparatus for collecting information from a plurality of measurement apparatuses, comprising:
at least one memory storing instructions, and
at least one processor configured to execute the instructions to;
receive first distance data indicating a distance from each of the plurality of the measurement apparatuses to an object in the surroundings thereof specified by the respective measurement apparatuses;
specify a position of each of the plurality of the measurement apparatuses using the first distance data and third distance data indicating a distance between the apparatuses included in the plurality of the measurement apparatuses;
extract at least three measurement apparatuses out of the plurality of the measurement apparatuses and to specify, based on the positions of the extracted measurement apparatuses, a candidate region that serves as a candidate of a common region referred to in performing alignment of data captured by the plurality of the measurement apparatuses; and determine the common region based on distribution of a plurality of the candidate regions obtained by changing combinations of the measurement apparatuses to be extracted.

12. The information processing apparatus according to claim 11, wherein the at least one processor is further configured to execute the instructions to specify positions of the first measurement apparatus and the second measurement apparatus by superimposing the first distance data of a second measurement apparatus included in the plurality of the measurement apparatuses on a position distant from the first measurement apparatus included in the plurality of the measurement apparatuses by a distance specified in the third distance data in the apparatus reference coordinate system having the position of the information processing apparatus set as a reference.

13. A data determining method performed in a measurement apparatus, the method comprising:

specifying, using an apparatus reference coordinate system having a position of the measurement apparatus set as a reference, a position of each of a plurality of other measurement apparatuses;

extracting at least three measurement apparatuses out of the measurement apparatus and the plurality of the other measurement apparatuses;

specifying, based on the positions of the extracted measurement apparatuses, a candidate region that serves as a candidate of a common region referred to in performing alignment of data captured by the measurement apparatus and the plurality of the other measurement apparatuses; and determining the common region based on the distribution of the plurality of the candidate regions obtained by changing combinations of the measurement apparatuses to be extracted.

* * * * *